# 3,276,558
EXTENSIBLE ROLLER CONVEYOR
Heinz Guske and Eberhard Rautenberg, both of Pregelstrasse 7, Essen, Germany
Filed Oct. 21, 1963, Ser. No. 317,740
Claims priority, application Germany, Oct. 19, 1962, G 36,177
2 Claims. (Cl. 193—35)

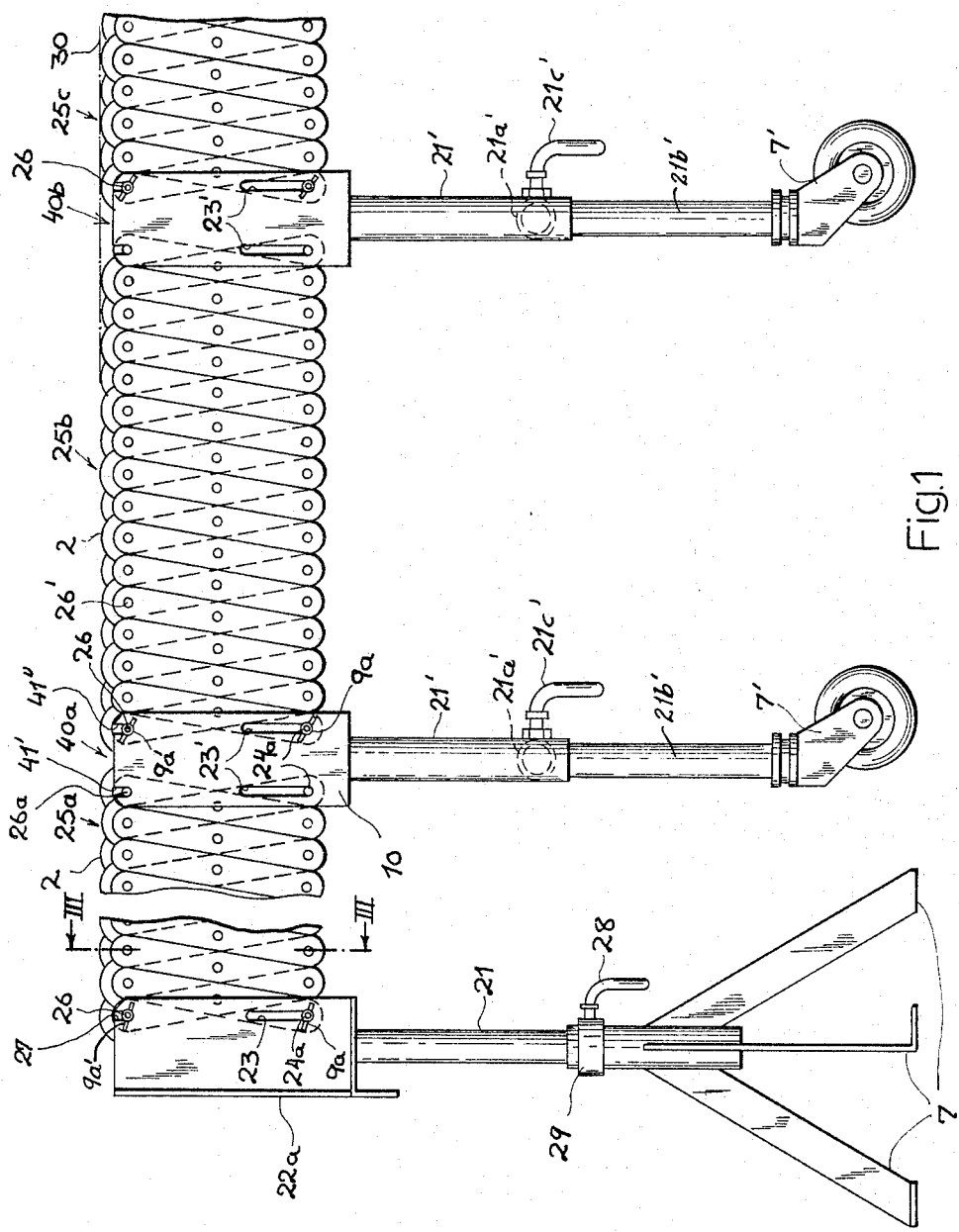

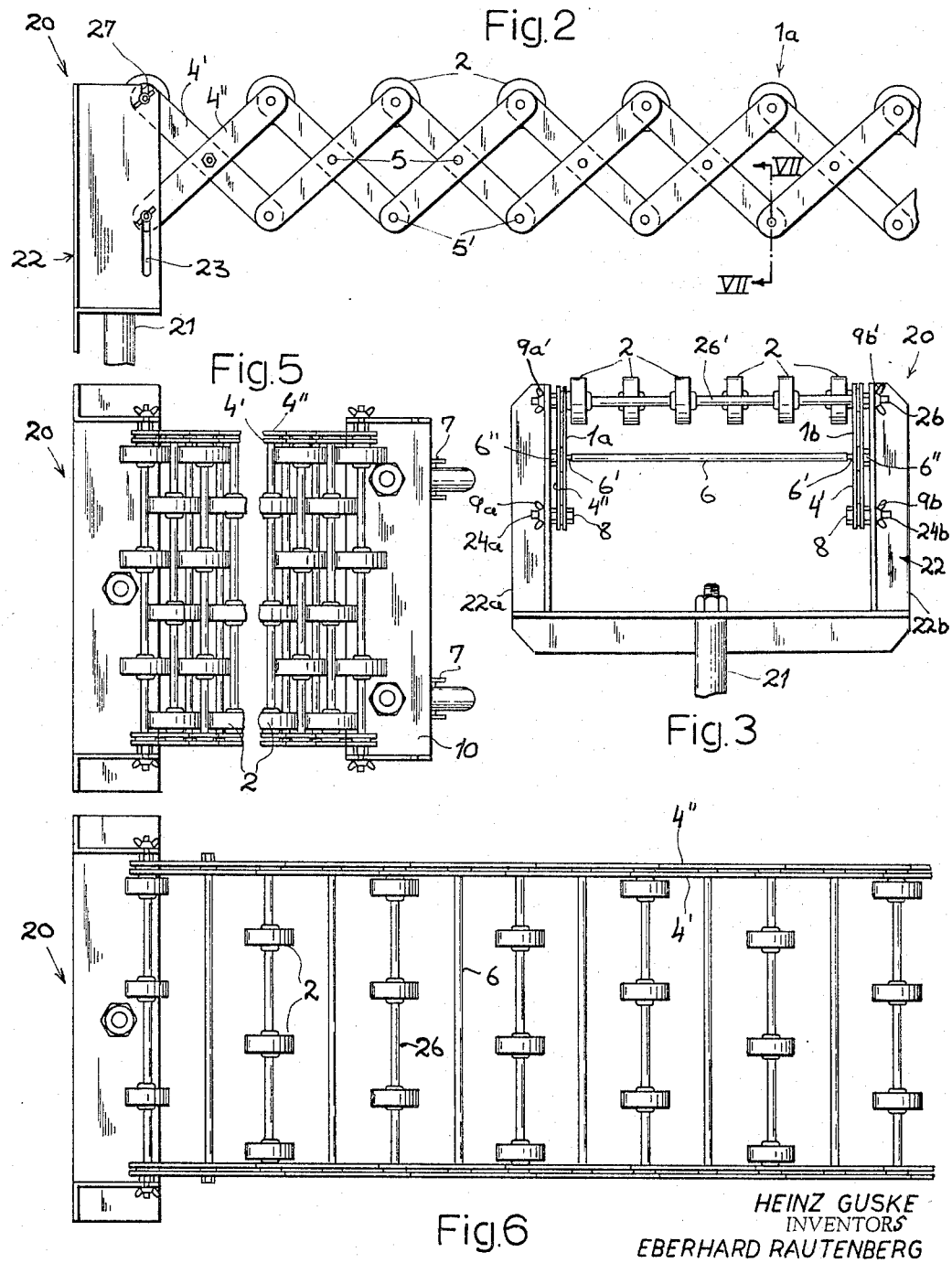

Our present invention relates to roller conveyors of the type wherein an array of longitudinally spaced rollers are rotatable about respective axes generally transverse to the transport path and form a generally planar receiving surface for the articles to be displaced therealong, these articles gliding along the upper portions of the rollers and successively engaging them as the articles travel along the transport path.

Usually roller conveyors of this character comprise generally rectangular support frames whose longitudinal sides are bridged by transversely extending rods lying substantially in a plane and forming axles for respective rollers journaled on these rods. When it is desired to extend or shorten the length of the conveyor, additional roller frames are secured to the first-mentioned frame at its extremities to lengthen the conveyor while shortening is accomplished by removal of one or more of the frames. To reduce the handling of individual frame portions, it has been proposed to provide telescopable frame assemblies which, however, have the disadvantage that frequently the receiving surfaces of the conveyor portions are not coplanar. Other methods of extending and retracting roller conveyors of the type described above have also been proposed but have failed to gain widespread acceptance as a consequence of the fact that they were not readily adaptable to situations wherein the transport path was required to curve in its plane. While curvilinear and sinuous transport paths have been accomplished by securing roller frames with fixed curvature together at their extremities, it must be pointed out that these devices could not readily be adjusted to compensate for different directions of curvature or different radii of curvature.

It is the principal object of the present invention, therefore, to provide an extensible roller conveyor adapted to form curvilinear (e.g. sinuous or simply curved) transport paths with varying radii and direction of curvature.

Another object of the present invention is to provide an extensible conveyor of the roller type having a plurality of roller-support sections adapted to be coupled together wherein the article-receiving surfaces of the roller arrays of the two sections are substantially coplanar.

Still another object of this invention is to provide a roller conveyor of variable length free from the need to handle individual roller sections of fixed length and adapted to be locked in position at any selected length.

The above and other objects, which will become apparent hereinafter, are attained, in accordance with the present invention, by providing a roller conveyor made up of a plurality of sections, each comprising a pair of laterally spaced lazy tongs lying generally in respective planes parallel to one another and perpendicular to the receiving surfaces of the conveyor formed by an array of rollers journaled upon transverse rods interconnecting the two lazy tongs at longitudinally spaced locations.

The lazy tongs are formed, in the usual manner, by a plurality of intersecting, hingedly interconnected rods, pivotally joined at their extremities to the extremities of adjacent pairs of intersecting rods throughout the length of the conveyor. While it has been noted that the lazy tongs each lie generally in a plane perpendicular to the receiving surfaces of the conveyor, it must be emphasized that this phraseology is intended to indicate only that each of the rods or pairs, which are of flattened configuration, lies in a vertical plane, i.e., transverse to the receiving surface which is generally horizontal or at an angle to the horizontal. It is an important feature of the present invention that one or more of the pivots interconnecting each set of rods be provided with sufficient play to enable both of the lazy tongs forming the roller-support means to be deflected from a straight lay into a curvilinear position, this curvature being in the plane of the receiving surface, i.e., in a direction transverse to the planes in which the rods lie.

It will be immediately apparent that the axis of curvature of the lazy tong will extend parallel to the rods at a location laterally spaced therefrom to either side of the roller conveyors so that the transport path can curve in any direction. Advantageously, each two of the pivots connecting each lazy tong bar with another is formed by one of the transverse rods interconnecting the two lazy tongs, the uppermost set of rods carrying the individual rollers. The rollers of adjacent pairs are axially offset so as to permit them to be interleaved in a retracted condition and afford a compact unit for storage and transport.

According to another feature of the present invention, which is especially important in the practical functioning of the device, a plurality of support members are provided to interconnect each pair of conveyor sections, at least some of these support members being in the form of stands carrying the conveyor. The two conveyor sections are secured to the support member so that their receiving surfaces are substantially coplanar, the attachment being effected by mounting the uppermost pivot, i.e., the one whose axis lies in the plane of the roller axes, of each section at substantially the same level on the support member. A lower pivot of each of the sections affixed to the support is preferably guided in vertical guide means (e.g., slots) formed on the support member and can be clamped thereto by suitable means locking the conveyor sections in selected retracted and extended positions. Additionally, or in place of the foregoing locking means mentioned above, the individual lazy-tong bars may be frictionally interconnected in a manner permitting sufficient play for the curvilinear configuration of the conveyor but such that the overall frictional force prevents displacement of the conveyor even under the weight of the load carried thereby. In this manner, the extensible conveyor sections can be cantilevered on one or both sides of the support member, which may be a bifurcated element whose two arms engage opposite lateral surfaces of the respective pair of lazy tongs. Preferably, at least one of the stands provided on a support member has a nonmovable, i.e., stationary, base so that the respective support member can be positioned at a fixed location while the remainder of the stands are provided with antifriction devices such as casters or rollers whereby the respective support member can be shifted relatively to the fixed support member. It will be immediately apparent that each of the conveyor sections between a pair of support members can have any desired configuration in any direction so that sinusoidal or sinuous transport paths can be provided or long transport paths having a common direction of curvature for all the conveyor sections with varying degrees of curvature as required.

The above and other objects, features and advantages of the present invention will become more readily apparent from the following description, reference being made to the accompanying drawing in which:

FIG. 1 is a side-elevational view of a roller conveyor according to the invention;

FIG. 2 is an elevational view showing the lazy tongs of the conveyor assembly extended;

FIG. 3 is a cross-sectional view taken along the line III—III of FIG. 1;

FIG. 5 is a plan view of a portion of the retracted conveyor illustrated in FIG. 1;

FIG. 6 is a plan view of the extended conveyor; and

Figure 4A:
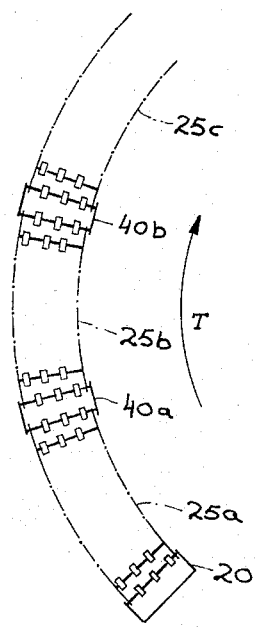
FIGS. 4A–4C are diagrammatic plan views illustrating various configurations of the conveyor assembly.

In FIGS. 1 and 5 we show the retracted roller conveyor in elevation, this conveyor comprising a generally stationary stand 20 whose legs 7 carry a shank 21 upon which a bifurcated bracket 22 (FIG. 2) of U-shaped configuration is mounted. This bracket constitutes the support member for the first section 25a of the conveyor whose other sections are identified by the reference numerals 25b, 25c etc. respectively. Bracket 22 is provided with upright arms 22a, 22b (FIG. 3) having respective slots 23 only one of which can be seen in FIG. 1. As will be apparent from FIG. 3, two lazy tongs 1a, 1b, constituting the roller-support means of the conveyor, have lower point pins 24a, 24b at their extremities, which are secured to stand 20, guided in slots 23 and adapted to be locked in place by respective butterfly nuts 9a, 9b. The upper pivot 26 of the conveyor section 25a is received within a cutout 27 (only one of which can be seen in FIG. 1) in each arm 22a, 22b of bracket 22, butterfly nuts 9a' and 9b' being provided to lock rod 26 in place. A clamping screw 28 is provided to tighten or release the split bushing 29 of base 7 in place along the shank 21 of the stand 20 so that the bracket can be raised and lowered thereon.

Referring now to FIG. 2, it may be seen that each of the lazy tongs 1a and 1b of each section 25a, 25b, 25c etc. is made up of a plurality of pairs of pivotally interconnected diagonally intersecting members 4', 4'', hinged together at their midpoints 5 by rods 6 (FIGS. 3 and 6), the lazy-tong bars 4', 4'' being loosely mounted upon the reduced shanks 6' of these rods and held in place by nuts 6''. Rods 6 also serve to interconnect the parallel lazy tongs 1a and 1b, which are also bridged by an upper array of rods 26' carrying rollers 2. The latter may be of the ball-bearing type and are freely rotatable on their respective rods 26 or 26'. The rollers 2 of the adjacent rods 26' are axially offset from one another (FIGS. 5 and 6) so that they interleave in a retracted position of the lazy tong (FIG. 5) and spread to form an article-receiving surface 30 indicated by dot-dash lines in FIG. 1, this spread condition being shown in FIGS. 2 and 6. At the lowermost pivots 5' of the lazy tongs, hollow rivets 8 may be provided to hold the bars 4', 4'' together, these rivets and the reduced portions of rods 6' and 26' clearing the respective apertures of the bars to provide the necessary play. It is clear, therefore, that the lazy tongs forming each section 25a, 25b etc. can be bent arcuately about a vertical axis spaced from the roller conveyor, the curvature being in either direction.

Figure 4B:
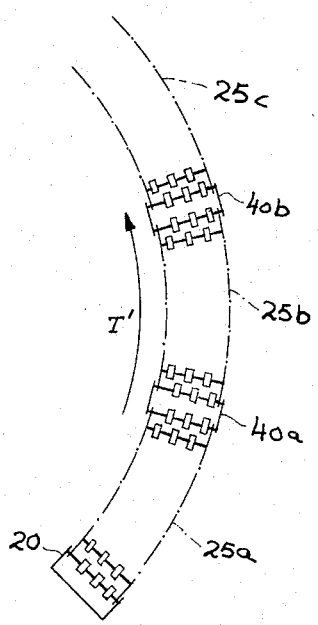
Figure 4C:
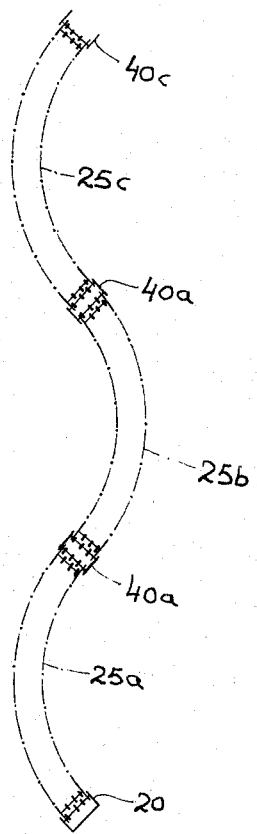

In FIGS. 4A–4C I show different configurations into which the conveyor assembly can be bent. FIG. 4A illustrates an arrangement wherein the curvature of the conveyor is generally clockwise (arrow T) from the stationary stand 20 while FIG. 4B shows this curvature to be counterclockwise (arrow T'). It should be noted that any one of the sections 25a, 25b, 25c can be straight or have a different radius of curvature from the other section and may even curve in an opposite direction as shown in FIG. 4C. In the latter, the roller conveyor has a sinuous curvature with the terminal sections 25a and 25c having clockwise curvatures and an intermediate section 25b having counterclockwise curvature.

Between the sections 25a, 25b, 25c there are provided movable support stands 40a, 40b, etc. whose posts 21' carry swivelable casters 7', the posts 21' having split portions 21a' tightenable by screws 21c' to engage a further portion 21b' of the post telescoped into the remainder thereof for vertical adjustment of the U-shaped bracket 10 provided upon each stand. These U-shaped brackets have recesses 41', 41'' in which the uppermost terminal rods 26, 26a of the sections are received, rods 26 being provided with butterfly nuts 9a' etc. as previously described. The lowermost pivots 24a of the adjoining section are guided in respective slots 23', each section having at least one butterfly nut 9a for locking engagement with the bracket to hold the respective section in any predetermined extended or retracted position. It should be noted at this juncture that one or more of the sections can be extended while another of the sections is retracted if this is desirable. The terminal sections 25c of the conveyors shown in FIGS. 4A and 4B are cantilevered upon the stand 40b, section 25c of FIG. 4C being supported by a further stand 40c.

Figure 7:
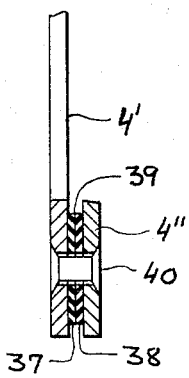
FIG. 7 is a cross-sectional view showing a pivot between the lazy-tong bars according to a further feature of this invention.

In FIG. 7 we show another method of providing play for the bars 4' and 4'' of the lazy tongs. In this modification, each of the bars is bonded to a respective annular member 37, 38 of a resiliently compressible material (e.g., rubber or leather) having a high coefficient of sliding friction at their common interface 39, a rivet 40 interconnecting the bars with peripheral clearance. When all or at least a substantial number of the pivots are provided with frictional faces of this character, forcible extension or retraction of the conveyor displaces the faces relatively, whereupon the high overall frictional force holds the lazy tongs in their extended or retracted positions as desired. While the additional locking means 9a, 9b can then be eliminated, it is contemplated in accordance with the present invention, to provide such pivots in the joints shown in the apparatus of FIG. 1, to supplement the locking action of the clamping nuts.

The invention described and illustrated is believed to admit of many modifications within the ability of persons skilled in the art, all such modifications being considered as coming within the spirit and scope of the appended claims.

We claim:
1. A roller conveyor comprising a support; a pair of parallel and laterally spaced lazy tongs mounted upon said support, each of said lazy tongs including a multiplicity of pairs of intersecting bars, centrally interconnected for relative swinging in upright planes, and pivots hingedly linking the upper and lower ends of said bars to corresponding ends of bars of adjoining pairs, said pivots including a generally planar array of transverse rods spanning said lazy tongs at the upper ends of their aligned bars; and a plurality of axially spaced rollers journaled on each of said rods for rotation thereabout, said rollers forming a receiving surface for articles to be transported; the interconnected ends of the bars of at least some of said pairs being provided with interposed resiliently compressible inserts and being traversed by the corresponding pivots with sufficient clearance to enable relative tilting of the interconnected pairs of bars about substantially vertical axes whereby said lazy tongs can be curved in a horizontal plane.

2. A conveyor as defined in claim 1 wherein said inserts are composed of two contacting friction layers each bonded to an adjoining bar, said layers resisting by their frictional engagement a relative swinging of the pivotally interconnected bars.

References Cited by the Examiner
UNITED STATES PATENTS 1,935,734 11/1933 Twomley _____ 193—35
2,678,125 5/1954 Bonney _____ 198—139

FOREIGN PATENTS 1,105,645 12/1955 France.
1,006,797 4/1957 Germany.

EVON C. BLUNK, *Primary Examiner.*

SAMUEL F. COLEMAN, HUGO O. SCHULZ, *Examiners.*

A. L. LEVINE, *Assistant Examiner.*